United States Patent [19]
Zhao

[11] Patent Number: 5,838,297
[45] Date of Patent: Nov. 17, 1998

[54] METHOD FOR COLOR IMAGE SCALING AND OTHER GEOMETRICAL TRANSFORMATIONS

[75] Inventor: Albert Z. Zhao, Markham, Canada

[73] Assignee: International Business Machines Corporation, Armonk, N.Y.

[21] Appl. No.: 350,782

[22] Filed: Dec. 7, 1994

[30]    Foreign Application Priority Data

May 20, 1994  [CA]  Canada .................................. 2124030

[51] Int. Cl.[6] ...................................................... G09G 5/00
[52] U.S. Cl. ............................................ 345/127; 345/136
[58] Field of Search .................... 395/139; 345/127–130, 345/136

[56]    References Cited

U.S. PATENT DOCUMENTS

| | | | |
|---|---|---|---|
| 4,242,678 | 12/1980 | Somerville .......................... | 345/127 X |
| 4,725,892 | 2/1988 | Suzuki et al. ...................... | 345/127 X |
| 4,918,626 | 4/1990 | Watkins et al. .................... | 345/136 |
| 5,010,324 | 4/1991 | Yamamoto ......................... | 345/127 |
| 5,029,228 | 7/1991 | Nonoyama et al. ............... | 345/127 X |
| 5,172,103 | 12/1992 | Kita .................................... | 345/127 |

FOREIGN PATENT DOCUMENTS

A-0 312 235  4/1989  European Pat. Off. .
A-0 550 088  7/1993  European Pat. Off. .

OTHER PUBLICATIONS

Your Computer, Nov. 1984, UK, vol. 4, No. 11, ISSN 0263–0885, pp. 106–107, Jones, M. "Zoom".

Patent Abstracts of Japan, vol. 015, No. 433 (P–1271), Nov. 5, 1991, & JP–A–03 179600 (Pioneer Electron Corp) Aug. 5, 1991.

Patent Abstracts of Japan, vol. 016, No. 191 (M–1245), May 8, 1992, & JP–A–04 027567 (Mitsubishi Electric Corp) Jan. 30, 1992.

Dr. Dobb's Journal, Aug. 1991, USA, vol. 16, No. 8, ISSN 0884–5395, pp. 94, 97–98, 100–101, 136, 138, 140, Pickles, G., "Scaling and printing faxes faster". European Search Report dated Feb. 5, 1996.

*Primary Examiner*—Amare Mengistu
*Attorney, Agent, or Firm*—Edward H. Duffield; Brian F. Russell; Andrew J. Dillon

[57]    ABSTRACT

A number of predefined code blocks are provided from which a sequence or block queue is selected and patterned for a single image line from the pixel image data on which a geometric transformation is to be performed. Once the block queue is generated, it is executed for each image line and the resulting transformed image data is stored in a separate memory or buffer.

9 Claims, 5 Drawing Sheets

METHOD FOR COLOR IMAGE SCALING AND OTHER GEOMETRICAL TRANSFORMATIONS

BACKGROUND OF THE INVENTION

1. Technical Field

The present invention is directed to an improved operation for effecting image data transformations such as image scaling. The proposed method is particularly useful for reducing processing time in scaling color images.

2. Description of the Related Art

Geometrical transformations of image data are essential operations used in computer graphics. Typical transformations include translation—the placement of symbols at appropriate positions in the image bit map, rotation—the orientation of images, and scaling—the sizing of images.

FIG. 1A represents a starting image of a house with its base set at coordinates (4,4) and (7,4). The x-y axis is used in this example to clearly illustrate the effect of scaling.

FIG. 1B illustrates the results when the image of FIG. 1A has been uniformly scaled by a factor of ½, that is, the proportions of the image are unaffected.

By contrast, FIG. 1C illustrates the results of scaling differentially the same image (from FIG. 1A). Here, the image is scaled by ½ in x and ¼ in y, with a resulting change in proportions of the image.

The conventional method for 24-bit color image scaling is a "pixel-by-pixel" approach that is referred to as "pixel replication". For example, in FIGS. 2A and 2B, each square represents a single pixel. Using pixel replication, each pixel of the image illustrated in FIG. 2A is replaced, in FIG. 2B, by an N-by-N block of pixels, thus enlarging the image by a scale factor of N. (As illustrated, FIG. 2B represents an image zoomed two times the scale of FIG. 2A.)

The problem with the conventional approach is that, for example during image scale-up, the vertical expansion is much more efficient than the horizontal one, as the pixels in each image line are generally stored together in a consecutive manner, except in some unusual implementations. Thus, the operations on the horizontal line considerably slows down the entire scaling process.

SUMMARY OF THE INVENTION

It is therefore an object of the present invention to provide a scaling method designed to significantly improve image line scaling, such as the process of horizontal expansion in image scale-up.

It is also an object of this invention to provide an improved method for performing geometric transformations, such as image scaling on image data, particularly color image data.

Accordingly the present invention provides a method for effecting geometric transformation of pixel image data from a source buffer in a processor environment that comprises the steps of generating a queue of code blocks for an image line of the pixel image data and executing the block queue for the image line into a destination buffer in the processor. Each of the blocks has at least one factor determined by the geometric transformation. The identical block queue is then executed for each remaining image line from the pixel image data and each copied into the destination buffer in the processing environment.

The invention also provides a method for scaling pixel image data from a source buffer in a processor environment that comprises the steps of generating a queue of code blocks for an image line of the pixel image data, each block having a scale factor, and then executing the queue of code blocks for each successive image line from the pixel image data into a destination buffer.

Finally, a mechanism for effecting geometric transformation of pixel image data is provided. Such mechanism consists of a cache of a plurality of predefined code blocks, each predefined code block having at least one factor of the geometric transformation. Means for selecting blocks from the cache of predefined blocks to form a block queue for an image line from the pixel image data is also provided, along with means for defining source and destination buffers for receiving pixel image data in a processing environment.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
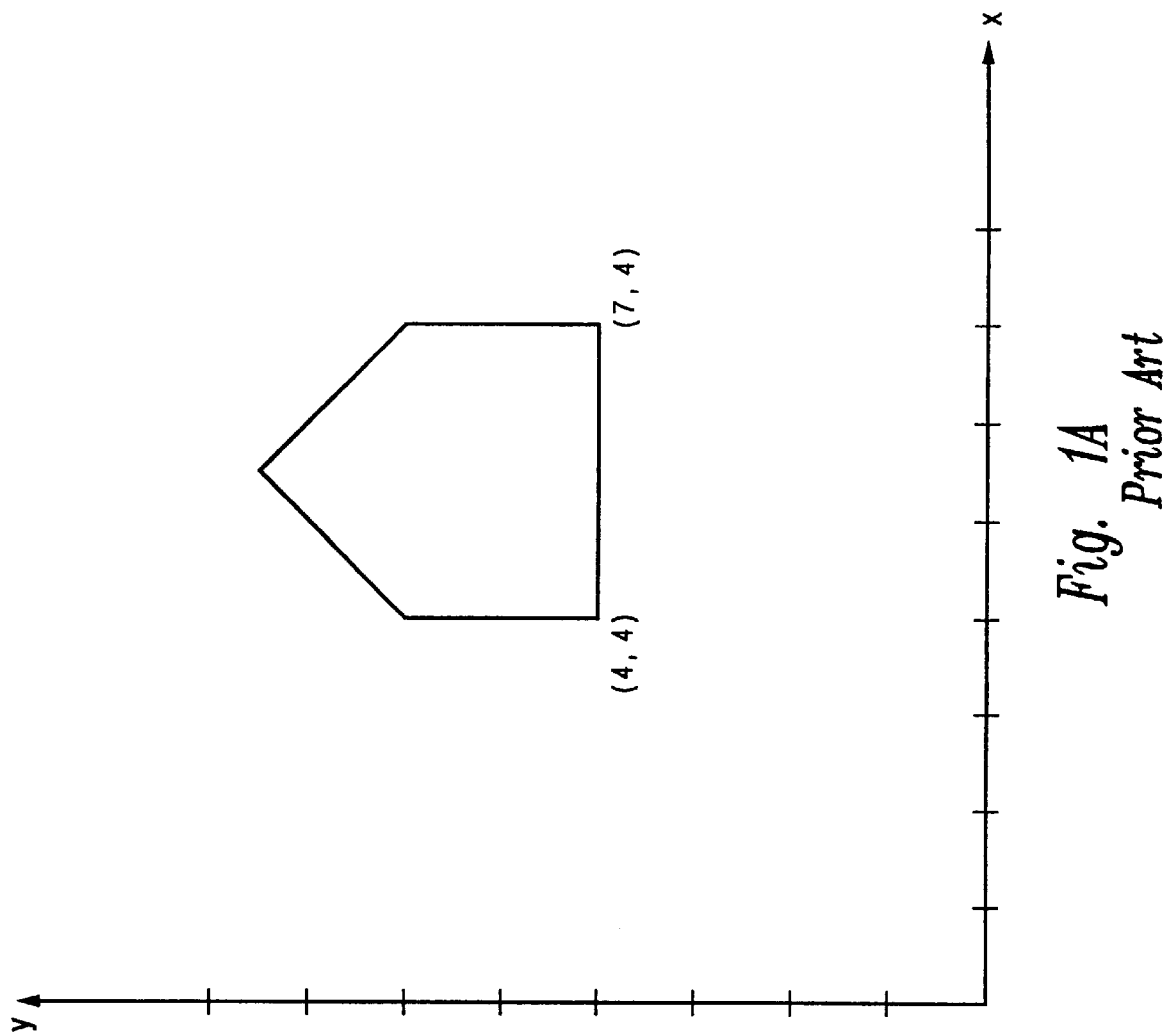
FIGS. 1A, 1B and 1C graphically illustrate uniform and differential scaling down.
Figure 1B:
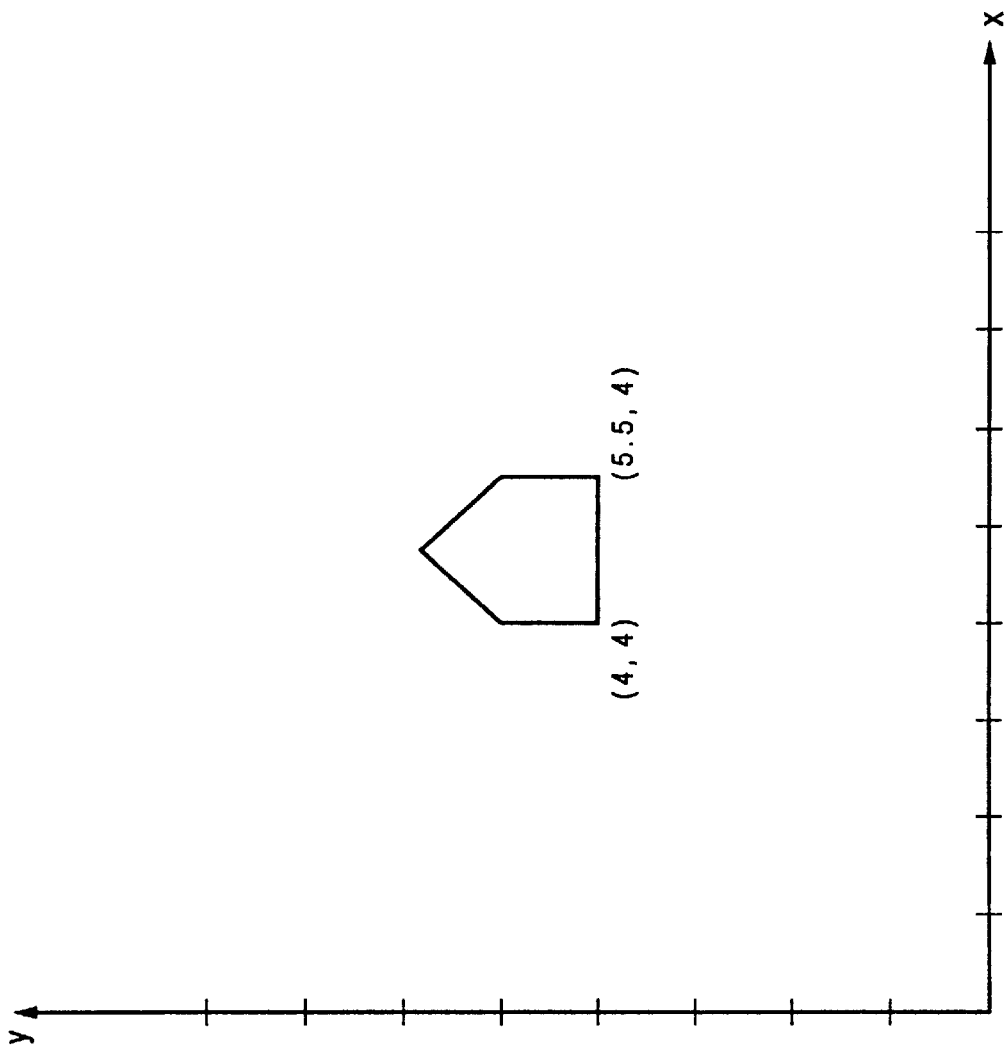
Figure 1C:
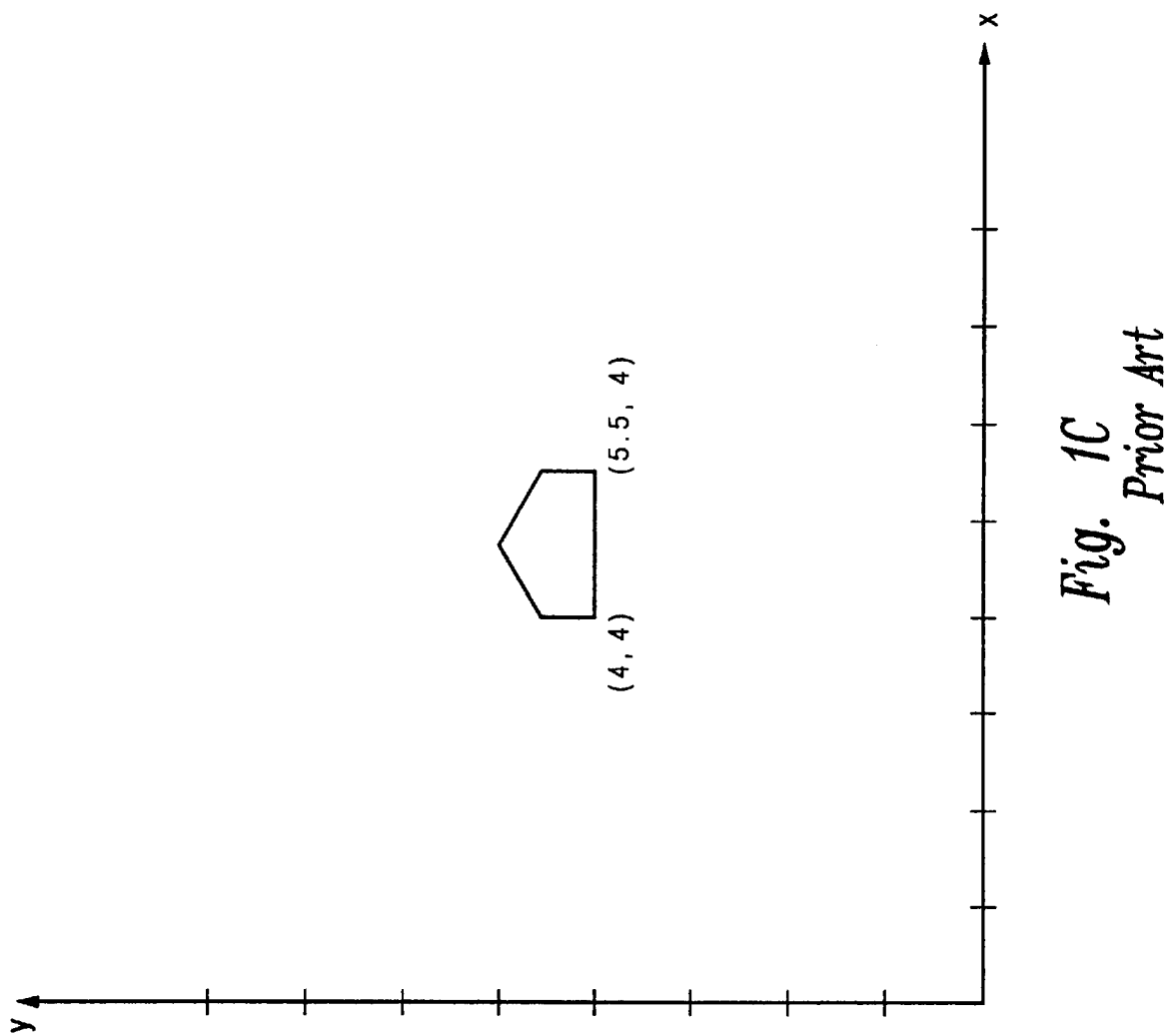
Figure 2A:
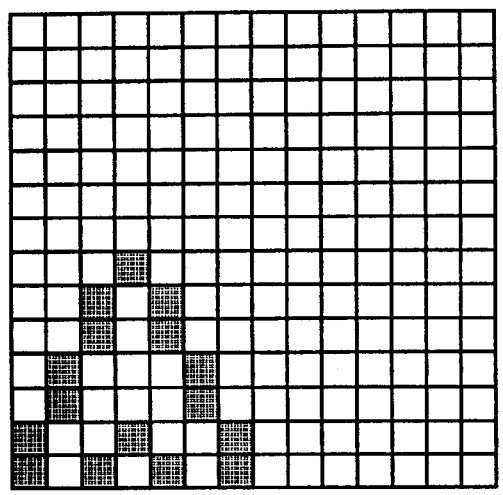
FIGS. 2A and 2B graphically illustrate uniform pixel-by-pixel scale-up of an image.
Figure 2B:
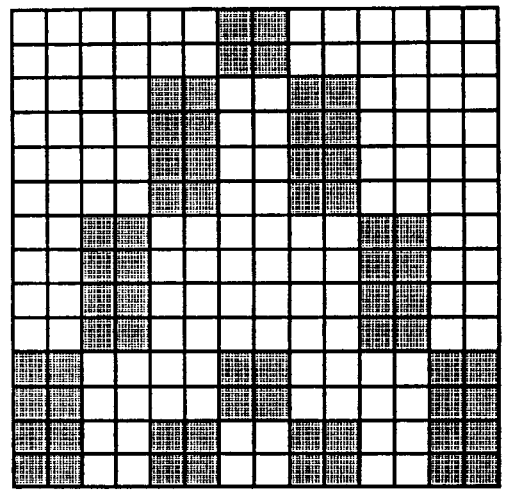
Figure 3:
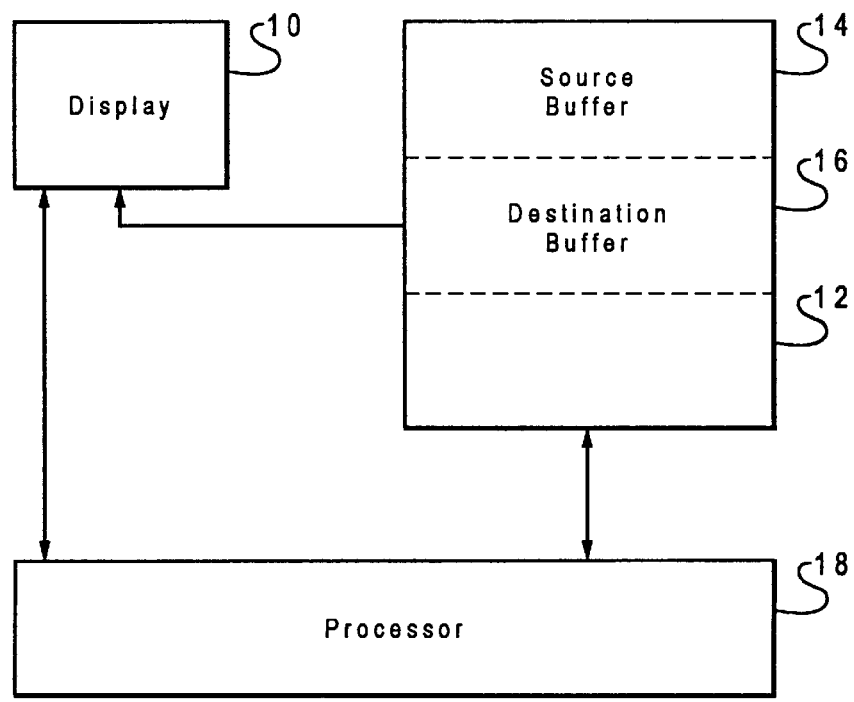
FIG. 3 is a block diagram illustrating a typical processing environment for executing the method of the invention.

Image data processing, according to the preferred embodiment of the invention, would commonly be implemented in a processing environment having components of the type illustrated in the block schematic diagram of FIG. 3.

Normally, a user would already have the image formed from the original pixel image data displayed on a computer display monitor 10 or the like, and from that display, would determine the need for scaling or performing some other geometric transformation on the image.

To implement the process of the present invention, the pixel image data is copied, generally from a buffer associated with the display, into the processing environment 12 of the system which has discrete areas of memory or buffers available. The processor 18 controls the display 10 and the processor environment 12.

In some computer processors, such as the Intel 80X86 family, data cannot easily be moved from one memory location to another directly, so an intervening register is generally used.

In describing the preferred embodiment of the invention, the buffer receiving input into the processing environment is referred to as a source buffer 14 while the buffer receiving processed image data or output is referred to as the destination buffer 16.

The preferred embodiment of the present invention will be described in association with the geometric transformation of image scaling. The present invention is particularly directed to an improved scaling operation, but it will be obvious to one skilled in the art that the same methodology could be utilized, with appropriate modifications, for effecting other geometrical transformations such as rotation and inverse transformations.

The core mechanism proposed in the present invention is the use of a pre-calculated block queue tailored to the size of an image line in the pixel image data. Each block in the queue is a small routine designed to a specific scaling operation.

(a) based on the given minimum block size N, draw a root node with N−1 children, (b) for each child of value I, generate all possible offspring with two conditions, (1) only three possible nodes (I−1), (I) and (I+1) as its direct children (2) summation of the values of the internal nodes (no leaf node) along any one path is less than N For example, in an implementation using a minimum block size of four, the block tree appears as follows:

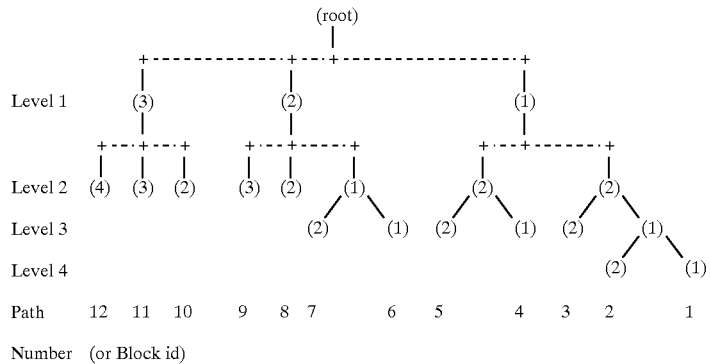

The present invention, generally, is to generate the block queue for an image line, and thereafter to execute the blocks from the block queue. When all blocks in the queue are executed, the image line will be scaled to the given size. Execution of the block queue is then repeated for all remaining image lines in the pixel image data.

Figure 4:
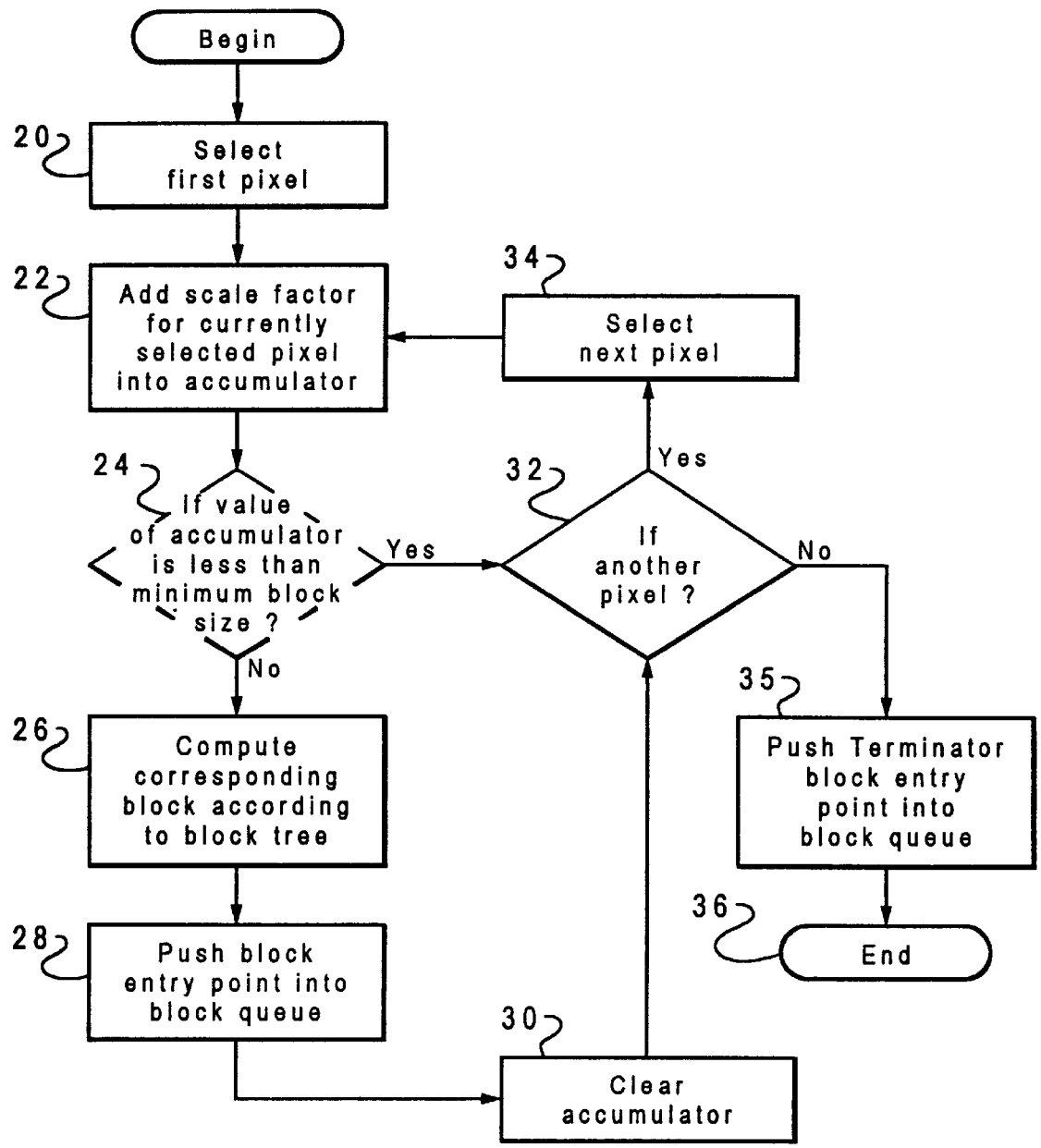
FIG. 4 is a flow diagram illustrating the steps for generation of a block queue, according to the preferred embodiment of the invention.

FIG. 4 illustrates, schematically, the computer implemented steps for generating the block queue. Taking a single image line, the first pixel is selected at step 20 and its scale factor is added into an accumulator at step 22. If the value of the accumulator is greater than or equal to the minimum block size (which is predetermined in the program) as shown at step 24, the corresponding block is computed for the queue according to a block tree at step 26 (described below). The block entry point is then pushed into the block queue at step 28 and the accumulator cleared at step 30.

An attempt is made to get the next pixel at step 32, and if this is successful at 34, a further block is computed for the block queue according to the steps described above. If no further pixels remain in the line, a terminator block entry point is pushed into the block queue at step 35.

The terminator block is a simple mechanism to handle the leftover pixels at the end of any image line longer than the image line on which the block queue has been patterned. It is a special non-return block added at the end of the queue which will cause execution of the block queue to quit, that is, it will prevent further checking to determine if the block queue is empty. Once the control is passed to the terminator block, it processes the leftover pixels, then quits the block queue execution of the current image line. In the preferred embodiment, the terminator block causes each leftover pixel to be copied from the source buffer to the destination buffer the number of times corresponding to the scale factor for the pixel.

In order to determine what and how many blocks are required for a given minimum block size, a block tree is generated according to the following rules:

Each path in this tree represents an input pixel sequence, that is, Level 1 node is the first input pixel, Level 2 node is the second input pixel, and so on. The number in brackets on each node is the scale factor for that pixel.

For example, the Path 1 of the tree (1)(1)(1)(1) represents four input pixels that all have the same pixel scale factor 1, while the Path 12 of the tree (3)(4) represents two input pixels, of which, the first pixel has a scale factor 3 and the second has a scale factor 4.

Based on the block tree given above, implementation of the block queue results in twelve hard coded blocks, as described hereafter.

BLOCK 1:

Take four pixels from the source buffer and move them to the destination buffer. This is represented in pseudo code as follows:

entry_point:
    Reg←i_pixel_buf[i]
    o_pixel_buf[j]←Reg
    Reg←i_pixel_buf[i+1]
    o_pixel_buf[j+1]←Reg
    Reg←i_pixel_buf[i+2]
    o_pixel_buf[j+2]←Reg
    Reg←i_pixel_buf[i+3]
    o_pixel_buf[j+3]←Reg
    i←i+4
    j←;+4 where i_pixel_buf is the input or source buffer which holds the original image line, o_pixel_buf is the output or destination buffer which holds the scaled image line, i and j are indexes for the input and output buffer, respectively, and Reg is a register required for an Intel 80X86 implementation.

It should be noted that the nature of color pixel image data is such that each pixel is composed of 24 bits, each 8 bits representative of one of the primary colors. However, transfer of image data is accomplished in 32-bit segments. Consequently, four pixels of image data can be transferred in only three operations. The same should be kept in mind for all subsequent examples.

BLOCK 2:
   Take four pixels from the source buffer and move them to the destination buffer with the last pixel being duplicated once
      entry_point:
         Reg←i_pixel_buf[i]
         o_pixel_buf[j]←Reg
         Reg←i_pixel_buf[i+1]
         o_pixel_buf[j+1]←Reg
         Reg←i_pixel_buf[i+2]
         o_pixel_buf[j+2]←Reg
         Reg←i_pixel_buf[i+3]
         o_pixel_buf[j+3]←Reg
         o_pixel_buf[j+4]←Reg
         i←i+4
         j←j+5

BLOCK 3:
   Take three pixels from the source buffer and move them to the destination buffer with the last pixel being duplicated once
      entry_point:
         Reg←i_pixel_buf[i]
         o_pixel_buf[j]←Reg
         Reg←i_pixel_buf[i+1]
         o_pixel_buf[j+1]←Reg
         Reg←i_pixel_buf[i+2]
         o_pixel_buf[j+2]←Reg
         o_pixel_buf[j+3]←Reg
         i←i+3
         j←j+4

BLOCK 4:
   Take three pixels from the source buffer and move them to the destination buffer with the middle pixel being duplicated once
      entry_point:
         Reg←i_pixel_buf[i]
         o_pixel_buf[j]←Reg
         Reg←i_pixel_buf[i+1]
         o_pixel_buf[j+1]←Reg
         o_pixel_buf[j+2]←Reg
         Reg←i_pixel_buf[i+2]
         o_pixel_buf[j+3]←Reg
         i←i+3
         j←j+4

BLOCK 5:
   Take three pixels from the source buffer and move them to the destination buffer with both middle and last pixels being duplicated once
      entry_point:
         Reg←i_pixel_buf[i]
         o_pixel_buf[j]←Reg
         Reg←i_pixel_buf[i+1]
         o_pixel_buf[j+1]Reg
         o_pixel_buf[j+2]Reg
         Reg←i_pixel_buf[i+2]
         o_pixel_buf[j+3]←Reg
         o_pixel_buf[j+4]←Reg
         i←i+3
         j←j+5

BLOCK 6:
   Take three pixels from the source buffer and move them to the destination buffer with the first pixel being duplicated once
      entry_point:
         Reg←i_pixel_buf[i]
         o_pixel_buf[j]←Reg
         o_pixel_buf[j+1]←Reg
         Reg←i_pixel_buf[i+1]
         o_pixel_buf[j+2]←Reg
         Reg←i_pixel_buf[i+2]
         o_pixel_buf[j+3]←Reg
         i←i+3
         j←j+4

BLOCK 7:
   Take three pixels from the source buffer and move them to the destination buffer with both first and last pixels being duplicated once
      entry_point:
         Reg←i_pixel_buf[i]
         o_pixel_buf[j]←Reg
         o_pixel_buf[j+1]Reg
         Reg←i_pixel_buf[i+1]
         o_pixel_buf[j+2]←Reg
         Reg←i_pixel_buf[i+2]
         o_pixel_buf[j+3]←Reg
         o_pixel_buf[j+4]←Reg
         i←i+3
         j←j+5

BLOCK 8:
   Take two pixels from the source buffer and move them to the destination buffer- with both pixels being duplicated once
      entry_point:
         Reg←i_pixel_buf[i]
         o_pixel_buf[j]←Reg
         o_pixel_buf[j+1]←Reg
         Reg←i_pixel_buf[i+1]
         o_pixel_buf[j+2]←Reg
         o_pixel_buf[j+3]←Reg
         i←i+2
         j←j+4

BLOCK 9:
   Take two pixels from the source buffer and move them to the destination buffer with the first pixel being duplicated once and the second being duplicated twice
      entry_point:
         Reg←i_pixel_buf[i]
         o_pixel_buf[j]←Reg
         o_pixel_buf[j+1]←Reg
         Reg←i_pixel_buf[i+1]
         o_pixel_buf[j+2]←Reg
         o_pixel_buf[j+3]←Reg
         o_pixel_buf[j+4]←Reg
         i←i+2
         j←j+5

BLOCK 10:
   Take two pixels from the source buffer and move them to the destination buffer with the first pixel being duplicated twice and the second being duplicated once
      entry_point:
         Reg←i_pixel_buf[i]
         o_pixel_buf[j]←Reg
         o_pixel_buf[j+1]←Reg
         o_pixel_buf[j+2]←Reg
         Reg←i_pixel_buf[i+1]
         o_pixel_buf[j+3]←Reg
         o_pixel_buf[j+4]←Reg
         i←i+2
         j←j+5

BLOCK 11:
   Take two pixels from the source buffer and move them to the destination buffer with both pixels being duplicated twice

```
entry_point:
    Reg←i_pixel_buf[i]
    o_pixel_buf[j]←Reg
    o_pixel_buf[j+1]←Reg
    o_pixel_buf[j+2]←Reg
    Reg←i_pixel_buf[i+1]
    o_pixel_buf[j+3]←Reg
    o_pixel_buf[j+4]←Reg
    o_pixel_buf[j+5]←Reg
    i←i+2
    j←j+6
```
BLOCK 12:

Take two pixels from the source buffer and move them to the destination buffer with the first pixel being duplicated twice and the second being duplicated three times
```
entry_point:
    Reg←i_pixel_buf[i]
    o_pixel_buf[j]←Reg
    o_pixel_buf[j+1]←Reg
    o_pixel_buf[j+2]←Reg
    Reg←i_pixel_buf[i+1]
    o_pixel_buf[j+3]←Reg
    o_pixel_buf[j+4]←Reg
    o_pixel_buf[j+5]←Reg
    o_pixel_buf[j+6]←Reg
    i←i+2
    j←j+7
```

Each of the twelve blocks are overhead free as each block is designed for a specific case and no checking, branching or any sort of supporting operations are used. The only overhead is in stringing successive blocks in the queue together.

According to the preferred embodiment of the invention, the cache of pre-defined blocks is complete with four general blocks, not part of the tree, to handle the cases where pixels have large scale factors greater than the minimum block size, as follows:

BLOCK 13:

Take one pixel from the source buffer, duplicate it $4 \times N$ times in the destination buffer. N is the loop counter initial value.
```
entry_point:
    counter←N
    Reg←i_pixel_buf[i]
loop_start:
    o_pixel_buf[j]←Reg
    o_pixel_buf[j+1]←Reg
    o_pixel_buf[j+2]←Reg
    o_pixel_buf[j+3]←Reg
    j←j+4
    counter←counter-1
    test counter
    if counter is not zero, jump to loop_start.
i←i+1
```
BLOCK 14:

Take one pixel from the source buffer, duplicate it $4 \times N+1$ times in the destination buffer. N is the loop counter initial value.
```
entry_point:
    counter←N
    Reg←i_pixel_buf[i]
loop_start :
    o_pixel_buf[j]←Reg
    o_pixel_buf[j+1]←Reg
    o_pixel_buf[j+2]←Reg
    o_pixel_buf[j+3]←Reg
    j←j+4
    counter←counter-1
    test counter
    if counter is not zero, jump to loop_start.
    o_pixel_buf[j]←Reg
    i←i+1
    j←j+1
```
BLOCK 15:

Take one pixel from the source buffer, duplicate it $4 \times N+2$ times in the destination buffer. N is the loop counter initial value.
```
entry_point:
    counter←N
    Reg←i_pixel_buf[i]
loop_start:
    o_pixel_buf[j]←Reg
    o_pixel_buf[j+1]←Reg
    o_pixel_buf[j+2]←Reg
    o_pixel_buf[j+3]←Reg
    j←j+4
    counter←counter-1
    test counter
    if counter is not zero, jump to loop_start.
    o_pixel_buf[j]←Reg
    o_pixel_buf[j+1]←Reg
    i←i+1
    j←j+2
```
BLOCK 16:

Take one pixel from the source buffer, duplicate it $4 \times N+3$ times in the destination buffer. N is the loop counter initial value.
```
entry_point:
    counter←N
    Reg←i_pixel_buf[i]
loop_start :
    o_pixel_buf[j]←Reg
    o_pixel_buf[j+1]←Reg
    o_pixel_buf[j+2]←Reg
    o_pixel_buf[j+3]←Reg
    j←j+4
    counter←counter-1
    test counter
    if counter is not zero, jump to loop_start.
    o_pixel_buf[j]←Reg
    o_pixel_buf[j+1]←Reg
    o_pixel_buf[j+2]←Reg
    i←i+1
    j←j+3
```

In the foregoing blocks, the initial value of the "loop counter" is determined simply by dividing the scale factor by the minimum block size which, in our example, is four. If the division is even and produces a zero remainder, block 13 is to be used. However, if a remainder of 1, 2 or 3 results, then block 14, 15 or 16, respectively, is used. Because division is a very expensive operation, division by four can be done very simply and inexpensively by shifting the scale factor right two bits.

Besides the operation of moving pixels, these four blocks will each execute one index increment, one counter decrement, one counter checking and one branching for every four output pixels. This significant overhead is not required for blocks 1 to 12, but in blocks 13 to 16, is shared by four pixels to reduce the burden.

Following generation of the block queue, it is executed for each line in the image data.

As an example of the operation of the present invention, assume the following two image lines and an image scale factor of 3.25:

P1 P2 P3 P4
P5 P6 P7 P8

The pixel scale factors have to be integrals, and their average should be the same as the image factor. Therefore, the pixel scale factors 3, 3, 3 and 4 may be assigned for column 1, column 2, column 3 and column 4 pixels, respectively, taken from the calculation 3.25=(3+3+3+4)÷4. Based on these pixel scale factors, the algorithm will generate a block queue containing three blocks:

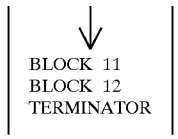

BLOCK 11
BLOCK 12
TERMINATOR

Following generation, the block queue will first be executed for the first image line. The inputs and outputs of the execution of the block queue on first image line are:

| INPUTS<br>(Source Buffer) | BLOCK<br>QUEUE | OUTPUTS<br>(Destination Buffer) |
|---|---|---|
| P1 P2 → | BLOCK 11 → | P1 P1 P1 P2 P2 P2 |
| P3 P4 → | BLOCK 12 → | P3 P3 P3 P4 P4 P4 P4 |
| NONE → | TERMINATOR → | NONE |

The scaled result of the first image line is:
P1 P1 P1 P2 P2 P2 P3 P3 P3 P4 P4 P4 P4

The same block queue and execution will apply to the second image line as well. The final scaled image line for the second original image line will be:
P5 P5 P5 P6 P6 P6 P7 P7 P7 P8 P8 P8 P8

The present invention has been described in detail in association with the scaling-up of image data. The same method can also be used for scaling down image data, and, with appropriate modifications obvious to one skilled in the art, for other types of geometric transformations of image data. All obvious modifications of the foregoing are intended to be covered by the appended claims.

While the invention has been particularly shown and described with reference to a preferred embodiment, it will be understood by those skilled in the art that various changes in form and detail may be made therein without departing from the spirit and scope of the invention.

I claim:

1. A method for effecting geometric transformation of pixel image data from a source buffer in a processor environment, said method comprising the steps of:
    (a) generating a queue of software code blocks for an image line of the pixel image data, each software code block in said queue having at least one factor determined by the geometric transformation, wherein the step of generating a queue of software code blocks for an image line comprises selecting software code blocks from a cache of pre-defined software code blocks and arranging said selected software code blocks in sequence for generating an image line for the geometric transformation;
    (b) executing the software code blocks from the queue for an image line of the pixel image data into a destination buffer in the processor; and
    (c) repeating step (b) for each remaining image line from the pixel image data.

2. A method according to claim 1, wherein the step of generating a queue of software code blocks for an image line comprises generating software code blocks that duplicate input pixels a number of times as a function of the geometric transformation.

3. A method for scaling pixel image data from a source buffer in a processor environment, said method comprising the steps of:
    generating a queue of software code blocks for an image line of the pixel image data, each software code block in said queue having a scale factor, wherein the step of generating a queue of software code blocks for an image line comprises selecting software code blocks from a cache of pre-defined software code blocks and arranging said selected software code blocks in sequence for generating a scaled image line; and
    executing the queue of software code blocks for each successive image line from the pixel image data into a destination buffer in the processor environment.

4. A method according to claim 3, wherein the step of generating a queue of software code blocks for an image line comprises adding a terminator software code block at the end of the queue for processing unprocessed pixels following execution of the software code blocks having scale factors.

5. A method according to claim 3, further comprising the steps of:
    locating unprocessed pixels from the image line following execution of the software code blocks; and
    copying said unprocessed pixels individually into the destination buffer.

6. A method according to claim 5, wherein the step of copying said unprocessed pixels individually into the destination buffer includes duplicating each said unprocessed pixel by the scale factor and copying the duplicated pixels into the destination buffer.

7. A data processing system for effecting geometric transformation of pixel image data, said data processing system comprising:
    a cache of a plurality of pre-defined code blocks, each pre-defined software code block having at least one factor of the geometric transformation;
    means for selecting blocks from the cache of pre-defined blocks to form a block queue for an image line from the pixel image data;
    means for defining source and destination buffers that receive pixel image data, wherein said means for defining the source and destination buffers includes means for copying the pixel image data into the source buffer; and
    means for executing the block queue for each image line from the pixel image data, wherein the means for executing the block queue for each image line includes means for copying the transformed pixel image data generated for each image line into the destination buffer.

8. A data processing system according to claim 7, further comprising means for displaying the geometric transformation of the pixel image data from the destination buffer.

9. A data processing system according to claim 7, wherein the pre-defined software code blocks, when executed, duplicate input pixels a number of times as a function of the geometric transformation.

* * * * *